United States Patent [19]
Lafferty

[11] Patent Number: 4,873,480
[45] Date of Patent: Oct. 10, 1989

[54] COUPLING NETWORK FOR IMPROVING CONVERSION EFFICIENCY OF PHOTOVOLTAIC POWER SOURCE

[76] Inventor: Donald L. Lafferty, 878 Chestnut St., San Francisco, Calif. 94133

[21] Appl. No.: 227,698

[22] Filed: Aug. 3, 1988

[51] Int. Cl.$^4$ .............................................. G05F 5/00
[52] U.S. Cl. .................................. 323/229; 323/906; 136/293
[58] Field of Search ................ 136/293; 323/299, 351, 323/906

[56] References Cited

U.S. PATENT DOCUMENTS

| | | | |
|---|---|---|---|
| 3,384,806 | 5/1968 | Hartman | 323/906 |
| 4,468,569 | 8/1984 | Norris | 323/299 |
| 4,556,838 | 12/1985 | Brasseur | 323/299 |
| 4,695,785 | 9/1987 | Mieth et al. | 323/906 |
| 4,728,878 | 3/1988 | Anthony | 136/293 |
| 4,742,291 | 5/1988 | Bobier et al. | 323/906 |

Primary Examiner—Peter S. Wong
Assistant Examiner—Jeffrey Sterrett

[57] ABSTRACT

A switching network for improving the conversion efficiency of a photovoltaic power supply comprises a variable coupling circuit for coupling an array of photovoltaic cells to a load resistance. The combined effective impedance of the network and load is varied to match the value required for maximum output power. A switching transistor (22) which connects the source module (20) to the load (30) is pulse-width modulated with a variable duty cycle determined by the control signal from the sensor circuit. A photovoltaic cell (32) similar to those comprising the photovoltaic power module (20) is used to track variations in the ambient light intensity. The open-circuit voltage of a sensor cell (32) is used to determine the proper value of duty cycle required for maximum power transfer. The output voltage of the module (20) is sampled and compared with the proper value to produce a control signal.

7 Claims, 2 Drawing Sheets

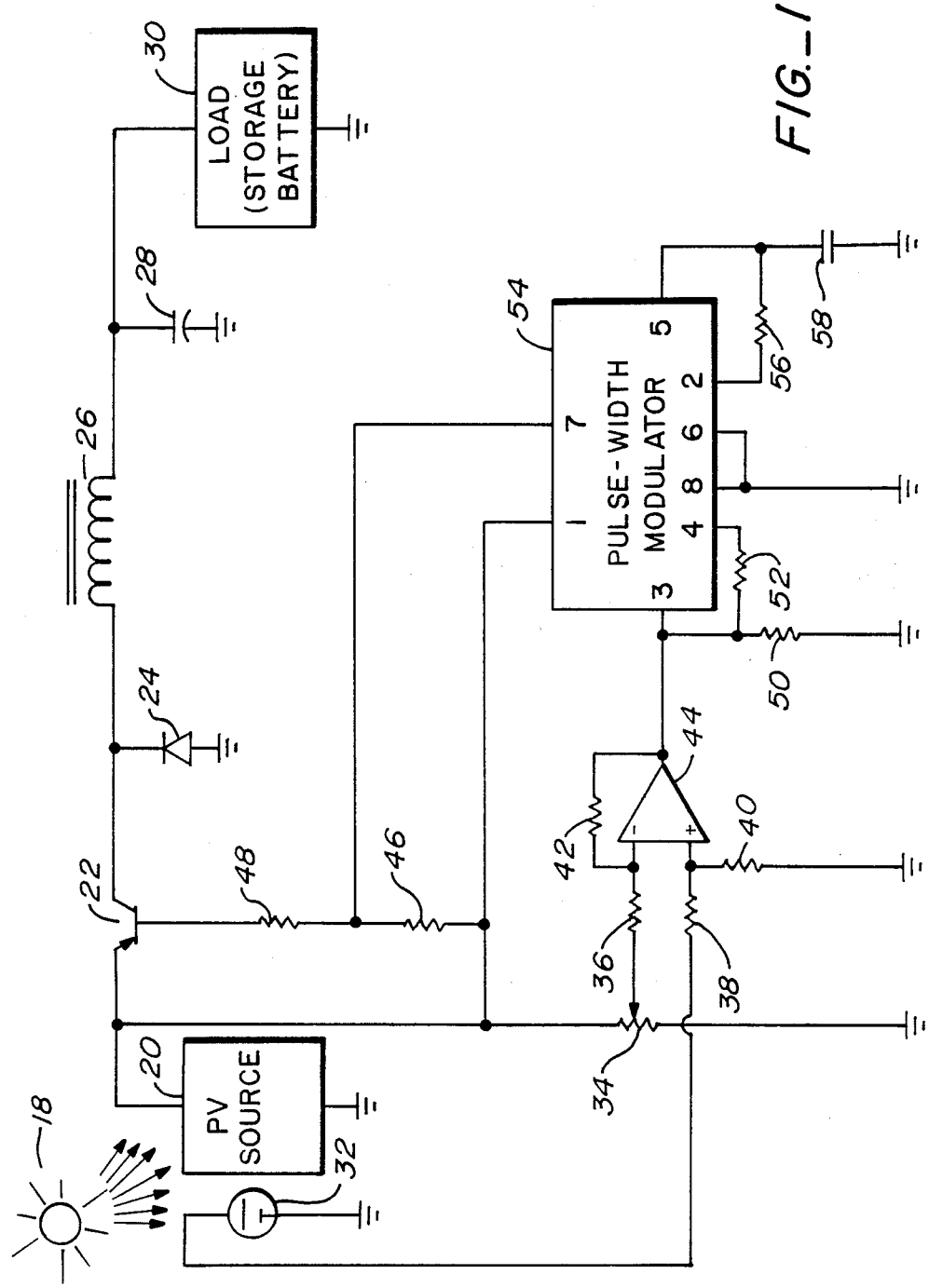
FIG._1

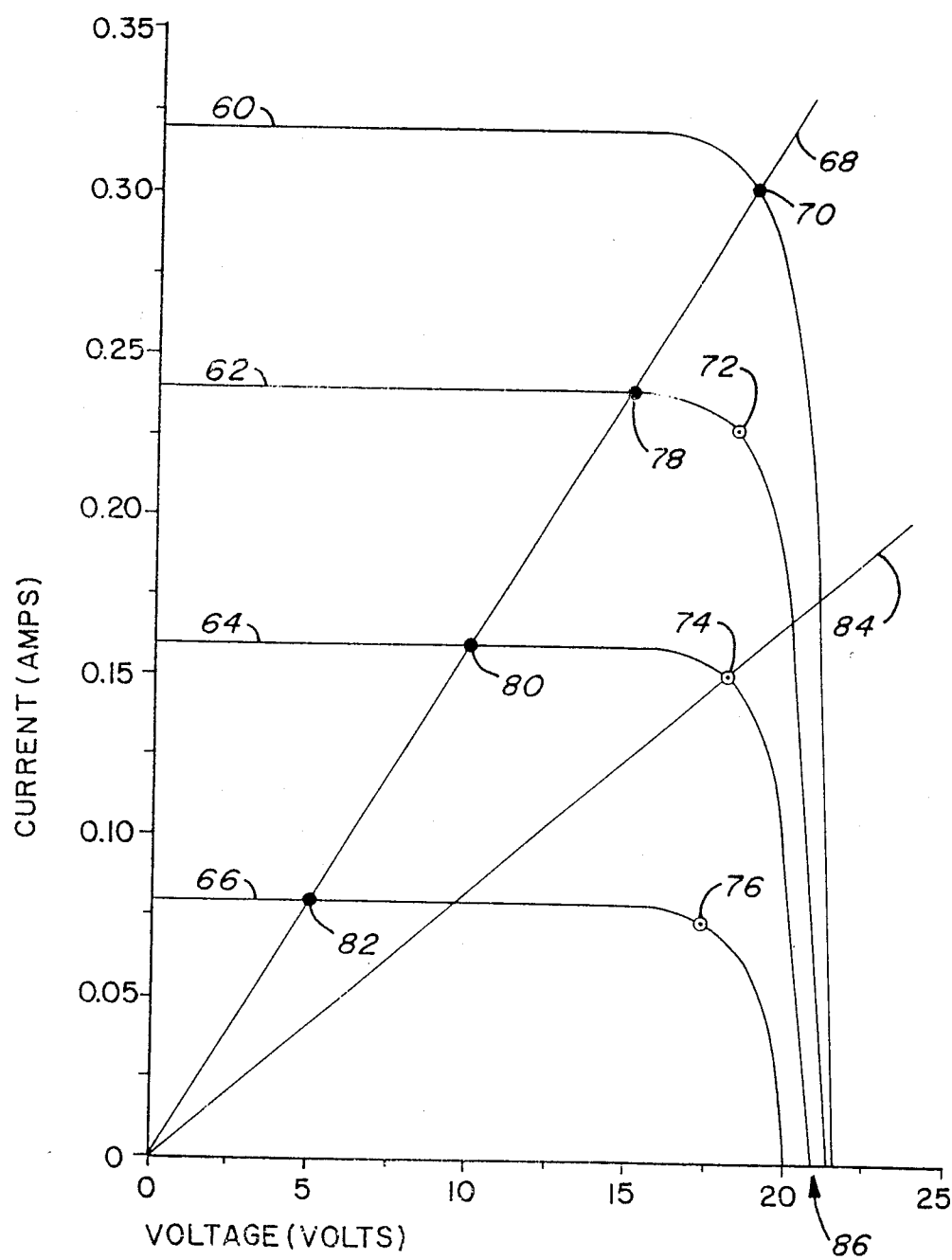
FIG._2

COUPLING NETWORK FOR IMPROVING CONVERSION EFFICIENCY OF PHOTOVOLTAIC POWER SOURCE

BACKGROUND

Field of Invention

This invention relates to a system for converting solar energy to electrical energy by an array of photovoltaic cells, specifically to a circuit for improving the conversion efficiency of such a system.

BACKGROUND

Discussion of Prior Art

A number of prior-art systems have been developed to couple an electrical power source to a load; among these are those of Hartman (U.S. Pat. No. 3,384,806, May 21, 1968), Norris (U.S. Pat. No. 4,468,569, Aug. 28, 1984), Brasseur (U.S. Pat. No. 4,556,838, Dec. 3, 1985), Mieth et al. (U.S. Pat. No. 4,695,785, Sept. 22, 1987), Anthony (U.S. Pat. No. 4,728,878, Mar. 1, 1988), and Bobier et al. (U.S. Pat. No. 4,742,291, May 3, 1988).

The coupling networks of Hartman, Norris, Brasseur, and Mieth employ some form of switching converter to ensure efficient power transfer from source to load. However, only Hartman, Norris, and Mieth teach power conversion efficiency of photovoltaic (PV) sources.

Variations of maximum power output of PV sources with radiation intensity and temperature changes require the load impedance to changed continually to maintain an impedance match.

The converters of Hartman, Norris, and Mieth use closed-loop control circuits to keep the load impedance adjusted to match that of the source. The voltage and/or current of the source are monitored to provide a voltage signal indicating the status of the source output. This status signal and a voltage reference signal are compared to generate an error signal. The reference voltage must track the I-V location of the maximum power point as it shifts with changes in radiation intensity and temperature. While these control circuits use the error signals to correct any deviations of the source status signal from the reference voltage, they have significant disadvantages.

In order to achieve maximum power transfer from source to load, terrestrial applications of PV sources require the reference signal to reflect changes in the I-V location of the maximum power point due to changes in temperature, as well as radiation intensity. The circuits of Hartman, Norris, and Mieth do not track the maximum power point with changes in temperature.

While Hartman obtains an error signal from a differentiation of the power function, his circuit requires complicated electronic procedures to extract the control logic from the error signal. Even then the reference voltage does not track varations in the maximum power point with temperature changes.

While Norris compares the source voltage to a preset, fixed reference voltage to provide an approximate method for tracking the maximum power point with radiation intensity, his system does not track with temperature.

Mieth measures the short-circuit current of the source to derive an error signal. However, Mieth's method requires involved, complex circuitry. Further, tracking the maximum power output with temperature is difficult since the short-circuit current increases with temperature while the maximum power decreases. This temperature dependence of power and current is illustrated in Mieth's FIG. 4.

OBJECTS AND ADVANTAGES

It is, therefore, a primary object of the present invention to provide an improved photovoltaic conversion system. Other objects are to provide such a system with an improved coupling network connecting the PV cells to their load, and to provide such a network where the conversion efficiency of PV power sources is improved by using the open-circuit voltage of a PV cell as a reference signal for the control loop.

Since the reference signal from an open-circuit PV cell tracks the maximum power point with both radiation intensity and temperature, the present invention therefore offers several advantages over the aforedescribed prior art.

In particular, the ability of my circuit to track variations in the location of the maximum power point arising from variations in radiation intensity and from variations in ambient temperature increases the conversion efficiency of PV sources.

Also, my invention uses techniques and components developed for highly-efficient switching regulators, and a minimum of signal processing steps, to achieve a simple, efficient circuit.

Further objects and advantages will become apparent as the description proceeds.

DRAWING FIGURES

FIG. 1 shows a functional block diagram of a solar energy system which incorporates a variable impedance matching network in accordance with my invention.

FIG. 2 shows current-versus-voltage characteristic curves of a photovoltaic power module.

DRAWING REFERENCE NUMERALS 18 sun as a source of radiation
20 PV (photovoltaic) power module
22 PNP switching transistor (TIP30A)
24 Schottky bypass diode
26 0.68 mH inductance
28 470 $\mu$F capacitor
30 load resistance
32 auxiliary photovoltaic cell
34 50 k$\Omega$ potentiometer
36 10 k$\Omega$ resistor
38 10 k$\Omega$ resistor
40 10 k$\Omega$ resistor
42 10 k$\Omega$ resistor
44 LM351 operational amplifier (National Semiconductor)
46 2.2 k$\Omega$ resistor
48 470$\Omega$ resistor
50 1 k$\Omega$ resistor
52 5 k$\Omega$ resistor
54 NE5561 integrated-circuit chip (Signetics)
56 18 k$\Omega$ resistor
58 0.0022 $\mu$F capacitor
60 I-V characteristic for light intensity of 100 mW/cm$^2$
62 I-V characteristic for 75 mW/cm$^2$
64 I-V characteristic for 50 mW/cm$^2$
66 I-V characteristic for 25 mW/cm$^2$
68 system's load line for 100 mW/cm$^2$
70 maximum power point at 100 mW/cm$^2$
72 maximum power point at 75 mW/cm$^2$ 74 maximum power point at 50 mW/cm²
76 maximum power point at 25 mW/cm²
78 system operating point at 75 mW/cm²
80 operating point at 50 mW/cm²
82 operating point at 25 mW/cm²
84 system's load line for 50 mW/cm²
86 region of open-circuit voltage

DESCRIPTION OF THE IMPEDANCE MATCHING NETWORK

FIG. 1 shows the electrical configuration of a network which couples a PV (Photovoltaic) moldule (group of PV cells) 20 to a load (storage batteries, capacitors, etc) 30. The internal impedance of module 20 varies with the intensity of the radiation it receives from sun 18. In prior-art systems, module 20 was connected directly to load 30 and the configuration of either or both module 20 and load 30 were adjusted so that their impedances matched at a particular level of sunlight intensity. Normally, this level was the maximum intensity, which occurs on a clear day with the sun optimally overhead. At this time, maximum power transfer occurred from module 20 to load 30. However, when the solar radiation was less than optimal (morning, evening, or partially cloudy) the impedance of module 20 increased, so that substantially less than all of the solar energy converted by module 20 was received by load 30.

In accordance with the invention I provide a network for coupling module 20 to load 30. The impedance of this coupling network, which comprises all the other components in FIG. 1, varies with solar intensity so as to insure optimal energy transfer.

Specifically, the coupling network comprises a high-frequency switching transistor 22 whose emitter is connected to the positive output terminal of module 20; The other terminal of module 20 is grounded. The collector of the transistor is connected to the cathode of a Schottky (very fast switching) diode 24 and to one terminal of inductor 26. The other terminal of the inductor is connected to capacitor 28 and to the positive output terminal of load 30. The anode of diode 24, the other terminal of capacitor 28, and the negative terminal of load 30 are grounded.

A separate of auxiliary photovoltaic cell 32, which is not part of power module 20, is positioned to receive substantially the same light from the sun 18 as does module 20. Cell 32 is connected to the non-inverting input of an operational amplifier (opamp) 44 through a resistor network 38 and 40. The inverting or negative input of opamp 44 is connected to the positive terminal of module 20 through a resistor 36 and a potentiometer 34. A feedback resistor 42 connects the output of opamp 44 to this input. The output of opamp 44 is also connected to the input (pin 3) of an error amplifier contained in a pulse-width modulation chip (integrated circuit) 54, and to the junction of resistors 50 and 52. The other terminal of resistor 50 is grounded and the other terminal of feedback resistor 52 is connected to the output (pin 4) of the internal error amplifier. Resistances 46 and 48 connect module 20 to the base of transistor 22 and to the square-wave output (pin 7) of the chip 54. An RC loop comprising resistor 56 and capacitor 58 connect the internal power supply (pin 2) and oscillator input (pin 5) to ground.

Operation of the Impedance Matching Network

To fully understand this invention it is first necessary to understand the photovoltaic (PV) characteristic curves shown in FIG. 2.

FIG. 2 is a plot of the I-V characteristics of module 20; it displays the system's response to solar radiation. Current is plotted on the vertical axis and voltage on the horizontal axis. Four curves 60, 62, 64, and 66 correspond to four decreasing levels of radiation intensity. Values of current and voltage yielding maximum power output at each level are designated at points 70, 72, 74, and 76. The system's load line for maximum power on curve 60 is represented by a diagonal line 68 from the origin through operating points 70, 78, 80, and 82. The system's load line for maximum power on curve 64 is shown as the diagonal line 84. The region where the four curves intersect the voltage axis is designated by reference number 86.

Top curve 60 is the characteristic response of the module to the maximum solar radiation at the surface of the earth (the power delivered is approximately 100 mW/cm²), i.e., when the sun is directly overhead on a clear summer day. Lower curves 62, 64, and 66 illustrate responses for decreasing intensities of power, namely 75, 50, and 25 mW/cm²; These represent less direct sunlight due to clouds, the time of day, etc. The points on the curves where values of voltage and current produce maximum power output are designated 70, 72, 74, and 76.

Straight line 68 extends from the origin up across the curves and represents the system's load line. The inverse slope of this line is the resistance of load 30. Line 68 intersects top curve 60 at point 70 of maximum power output. This is the operating point for this particular level of solar illumination, i.e., it indicates the output voltage and current of the module (18.7 V, 0.304 A), and the power (5.6 W). It can be seen that the operating point deviates further from the desired maximum as the light intensity decreases.

Photovoltaic power sources are normally used to store energy during the peak daylight hours by charging batteries, capacitors, or powering an inverter which converts the DC electrical energy to AC electrical energy for use by an electrical utility company. Such sources are designed to work into a fixed load resistance, in this case the resistance corresponding to the inverse slope of the system's load line 68.

I have found that considerably more power can be extracted from the PV source if the load line can be changed as necessary according to the intensity of the incident radiation. The load line will then interest the characteristic curves at their points of maximum power output. In other words, more power can be transferred from the PV module to the load when the effective load impedance is adjusted to match the PV source resistance.

The invention provides an active coupling network with a variable input impedance to accomplish this result. A reference signal from auxiliary cell 32 is used to adjust the impedance, or the load line, as the illumination changes.

The circuit was chosen because it is simple and has a theoretical efficiency of 100%, a matter of utmost concern here.

Pulsing switching transistor 22 on and off at a high frequency, e.g., 25 kHz, controls the flow of current from PV module 20 to load 30. The transistor is pulse-width modulated with a duty cycle which varies in accordance with solar conditions; I.e., when the solar radiation increases, the reference signal from the sensor cell 32 turns transistor 22 on for a larger fraction of each cycle. In accordance with Ohm's law, when the current (average) increases at a constant voltage, the impedance decreases. This decrease in impedance increases the slope (1/R) of the load line to match the internal impedance at the higher level of radiation. Conversely, as the solar intensity decreases, the on-time per cycle of the transistor decreases. This reduces the average current flow from the PV source to the load which in turn causes the load to appear to the source as a higher impedance. The higher impedance decreases the slope of the load line to reflect the reduced intensity of solar radiation.

LC circuit 26-28 filters the high-frequency ripple introduced by transistor 22. The switching circuit can be understood in terms of basic characteristics of capacitive and inductive circuits. The first step in filtering the ripple from the load is to place a capacitor in parallel with the load. However, switching a voltage source into a capacitance gives rise to large current spikes since the capacitor is essentially a short circuit. A series inductance provides a nondissipative way to limit the current flow from the source. On the other hand, when the transistor cuts off, the sudden interruption of current through the inductance generates large voltage spikes because di/dt (the time rate of change of current) is large. The idea then is to simultaneously close one switch (diode) when the switch supplying the current (transistor) is opened so that a current path for the inductance is maintained. Diode 24 conducts when the negative voltage spike provides a forward bias, allowing the inductance to discharge its stored energy to the load.

Chip 54 uses an internal reference voltage, an error amplifier, an oscillator, and a comparator to provide the switching control signal to transistor 22. Its output (pin 7) is a square wave with a variable duty cycle controlled by the input from opamp 44. The width of the square wave determines the percentage on-time, or duty cycle, of transistor 22.

Power module 20 consists, in one exemplary embodiment, of thirty-six single-crystal, silicon PV cells connected in series. Each cell had an open-circuit voltage of 0.6 V and a short-circuit current of 0.32 A under the conditions represented by curve 60 of FIG. 2. Curve 60 intersects the current axis at 0.32 A, which is the short-circuit current since the voltage is zero at this point. The curve intersects the voltage axis at 21.5 V (open circuit voltage) which is approximately 36 times the open-circuit cell voltage. It can be seen that the intersections of curves 62, 64, and 66 with the voltage axis, in the region designated 86, occur at progressively lower voltages. This variation of open-circuit voltage with light intensity is monitored by photovoltaic cell 32, a cell with the same response as those cells comprising module 20.

The open-circuit voltage of any PV cell is proportional to the logarithm of the incident radiation intensity and is a convenient parameter to track. The voltage at which the maximum power output occurs is proportional to the open-circuit voltage. The open-circuit voltage of cell 32 is monitored to track the ambient light intensity. This tracking signal is used as a reference voltage by opamp 44. A sample of output voltage from PV module 20 is compared to this reference voltage by opamp 44. In response opamp 44 generates the difference signal which it supplies to the control input (pin 3) of chip 54, which in turn adjusts the duty cycle of switching transistor 22 accordingly.

The impedance of the load will thus be effectively adjusted by controlling the duty cycle, or the percentage time, PV source 20 sees the laod 30. The effective impedance of the load 30 is given by the formula $R/D^2$ where R is the fixed load resistance 30 and D is the variable duty cycle of switching transistor 22. The coupling network thus transforms the fixed resistance R of load 30 so that it appears to PV source 20 as a resistance with value $R/D^2$.

EXAMPLE

Consider the following illustrative example: Assume that the light intensity at 1200 hrs on a given day is such that the characteristic curve of module 20 corresponds to curve 60 of FIG. 2 and that the load line intersects curve 60 at point 70. The inverse slope of line 68 is approximately 61 ohms. With a modulation, or duty cycle, of 80%, i.e., transistor 22 is on 80% of the time, the fixed resistance of load 30 is about 39 ohms ($0.64 \times 61$ ohms = 39 ohms).

As the sun declines from the zenith, the reference signal from detector 32 decreases in voltage, causing transistor 22 to conduct a smaller fraction of each cycle. The effective resistance of the load increases and, consequently, the system's load line becomes more horizontal. By 1600 hrs the intensity has decreased so that the characteristic curve of module 20 now corresponds to curve 64 of FIG. 2. Line 68 has gradually shifted to the position of line 84 and now has a resistance of 118 ohms. The duty cycle has decreased to 57.5% as determined from the equation $39\Omega/D^2 = 118\Omega$ The coordinates of point 70 are approximately 18.7 V, 0.304 A, which gives 5.7 W for the power output. The power at point 74 is $(18\ V)(0.153\ A) = 2.8\ W$ which is to be contrasted with the value $(9.8\ V)(0.16\ A) = 1.6\ W$ at point 80; the 1.6 W is what the system would have delivered had the coupling network of the invention not been used, i.e., had the 61 ohms of line 68 been used as a fixed resistance.

A qualitative discussion of the system's operation will perhaps be helpful. It can be seen from FIG. 2 that the maximum power output occurs at nearly the same voltage ($V_m$) for each curve; For maximum power output the voltage is essentially the same for any level of illumination. To the extent that $V_m$ is constant, the product IR is constant. At any instant the module contains electrical energy VQ where Q is the charge produced by the absorption of photons. Since the production of charge in the module is proportional to the intensity of the incident radiation, the production rate dQ/dt should equal I to keep $V_m$ constant; Input equals output. When dQ/dt decreases, as in the example above, I must decrease. The current flow out of the module is reduced by decreasing the duty cycle of the transistor. The reduction in current is equivalent to an increase in resistance which changes the slope of the load line to the appropriate value.

A simple calculation will illustrate the advantage of the variable impedance network over fixed resistance coupling. Consider the total power generated by each of the two systems under similar conditions during a twelve-hour period. Atmospheric effects will be ignored so that the analysis will be a purely geometric problem.

The sun rises at 0600 hrs and 0 radians, ascends to the zenith at 1200 hrs and $\pi/2$ radians, and sets at 1800 hrs and $\pi$ radians. The conditions at noon will correspond to curve 60 of FIG. 2 with a maximum power output of $P_m = 5.7$ W at point 70. The radiation intensity will vary as $\sin \theta$ over the period of interest.

Case 1
Fixed Resistance

The equation of a straight line is $y = mx + b$, so that the fixed load line is given by $I = mV + 0 = V/R$. Then $V = IR$ where R is constant. The power for the case of fixed resistance is $$P_1 = VI = I^2 R$$

so that the power output for Case 1 as a function of angle is $$p_l = P_m \int_{\theta_1}^{\theta_2} \sin^2\theta \, d\theta$$

The integral evaluated between the limits of 0 and $\pi$ gives the total power for the twelve-hour period:

$$P_1 = (\pi/2) P_m$$

Case 2
Coupling Network

In Case 2 the resistance changes continuously but the voltage is approximately constant. The expression for the power is $$P_2 = VI = V_m I$$

where $V_m$ is the constant voltage for maximum power output. It is to be noted that in Case 2 the power is proportional to the current I and not $I^2$. The expression for the power as a function of angle is then $$P_2 = P_m \int_{\theta_1}^{\theta_2} \sin\theta \, d\theta$$

This integral over the angular region 0 to $\pi$ gives $$P_2 = 2 P_m$$

for the total power output for Case 2. The percentage increase of Case 2 over Case 1 is $$\% \ Increase = (P_2 - P_1)/P_1 \times 100$$

$$\% \ Increase = (2 - 1.57)/1.57 \times 100 = 27.4\%$$

The inclusion of atmospheric influences in the problem is expected to further increase the performance of Case 2 compared to Case 1. The ability of the coupling network to adjust the effective load resistance for local variations in sun light on a continuing basis will significantly enhance the power output of Case 2 over the value calculated above.

The coupling network represents an improvement over fixed resistance coupling and improves the conversion efficiency of PV power supplies.

Conclusion, Ramifications and Scope Of Invention

The reader will see that I have provided a switching network with an input impedance that is varied by a reference signal from a sensor PV cell to match the resistance required for maximum output power from the PV source under conditions of changing light intensity. This network thereby provides a significant improvement in the efficiency of solar power sources.

While a relative simple version of the invention has been discussed, a number of enhancements and variations can be provided. For example, the switching transistor can be any power switch device capable of high-frequency operation with a controllable duty cycle, such as PNP or NPN bipolar transistors, MOSFET devices, or the recently developed solid state triode (SST).

Alternative circuit configurations, i.e., different arrangements of transistors, diodes, inductance,s and capacitances can be used to obtain results similar to those obtained by the circuit as shown in FIG. 1. Further, other IC control chips than the one indicated in FIG. 1 can be used.

Also, there are other ways of generating and processing the control signal which varies the width of the pulse which drives the switching transistor. One need only monitor the light intensity by some device sensitive to solar radiation. When one or more PV cells are used for tracking purposes, the open-circuit voltage, the short-circuit current, the resistance, the power, and other light-sensitive characteristics of the cell will suffice for reference signals. A photodiode could be calibrated to supply the same information. The sensor PV cell could be eliminated and the output of the power module itself could be used to ascertain the value of matching impedance for maximum power output.

Accordingly, the scope of the invention should be determined not by the embodiment illustrated, but the appended claims and their legal equivalents.

I claim:

1. A control circuit for matching the electrical impedance of a photovoltaic power source and a load driven therefrom, comprising:
   voltage sensing means, comprising a photovoltaic cell, for providing a reference voltage indicative of a desired output voltage of said photovoltaic power source,
   circuit means for comparing the actual voltage of said photovoltaic power source and said reference voltage for producing a difference signal indicative of the difference, if any, between said reference voltage and said actual voltage of said photovoltaic power source,
   control means, connected to said circuit means, for producing a modulated control signal, the modulation of said control signal being indicative of said voltage difference,
   switching means for repetitively switching on and off the current flow from said photovoltaic power source to said load, said switching means being responsive to said control signal to vary the proportion of time that said current is switched on in relation to the proportion of time that said current is switched off so as to maintain the output voltage of said photovoltaic power source at a substantially constant level, whereby maximum power is transferred from said photovoltaic power source to said load, even when the solar radiation intensity received by, and ambient temperature of, said photovoltaic source vary.

2. The control circuit according to claim 1 wherein said voltage sensing means comprise a plurality of said photovoltaic cells.

3. The control circuit of claim 1 wherein said photovoltaic cell of said voltage sensing means comprises:

an unloaded photovoltaic cell with current-voltage characteristics similar to current-voltage characteristics of said photovoltaic power source, said photovoltaic cell positioned such that it is exposed to the same radiation and temperature environment as said photovoltaic power source, thereby to provide an open-circuit voltage for use as a refernece signal indicative of said source voltage corresponding to maximum power output.

4. The control circuit according to claim 3 wherein said voltage sensing means comprises a plurality of said photovoltaic cells.

5. The control circuit of claim 1 wherein said circuit means is a voltage comparator.

6. The control circuit of claim 1 wherein said control means is a pulse-width modulator.

7. The control circuit of claim 1 wherein said switching means is a switching converter circuit.

* * * * *